(12) United States Patent
Laskovy et al.

(10) Patent No.: US 10,975,940 B2
(45) Date of Patent: Apr. 13, 2021

(54) ACTUATOR AND METHOD

(71) Applicant: Eaton Intelligent Power Limited, Dublin (IE)

(72) Inventors: Andrew M. Laskovy, Hundsonville, MI (US); Douglas A. Gordon, Muskegon, MI (US); Derek P. Dougherty, Fruitport, MI (US)

(73) Assignee: Eaton Intelligent Power Limited, Dublin (IE)

( * ) Notice: Subject to any disclaimer, the term of this patent is extended or adjusted under 35 U.S.C. 154(b) by 0 days.

(21) Appl. No.: 16/110,181

(22) Filed: Aug. 23, 2018

(65) Prior Publication Data
US 2019/0063568 A1    Feb. 28, 2019

Related U.S. Application Data

(60) Provisional application No. 62/549,630, filed on Aug. 24, 2017.

(51) Int. Cl.
*F16H 25/20* (2006.01)
*F16H 25/22* (2006.01)
(Continued)

(52) U.S. Cl.
CPC .......... *F16H 25/205* (2013.01); *B64C 13/32* (2013.01); *B64C 13/505* (2018.01); *F16H 19/02* (2013.01);
(Continued)

(58) Field of Classification Search
CPC .............. F16H 25/205; F16H 25/2015; F16H 25/2204; F16H 25/02; F16H 25/2006;
(Continued)

(56) References Cited

U.S. PATENT DOCUMENTS 2,630,022 A * 3/1953 Terdina ............... F16H 25/2018
                                                    74/89.3
3,393,575 A * 7/1968 Irwin .................. F16H 25/2209
                                                    74/89.42
(Continued)

FOREIGN PATENT DOCUMENTS

DE   102011018446 A1 * 10/2012 .......... B64C 13/341
DE   102011119946 A1 *  6/2013 .......... F16H 25/205
GB       2291949 B  *  4/1997 .......... F16K 31/047

*Primary Examiner* — Jake Cook
*Assistant Examiner* — T. Scott Fix
(74) *Attorney, Agent, or Firm* — Fishman Stewart PLLC (57) ABSTRACT

An actuator includes an end fitting, a ball screw connected to the end fitting, a ball nut engaged with the ball screw, a rod disposed at least partially within the ball screw, and a rotating member engaged with the rod. A method of verifying an actuator may include rotating a manual input portion in a first direction under substantially no load until the manual input portion stops, rotating the manual input portion in a second, opposite direction until a first torque is measured, determining a first rotational angle at which the first torque was measured, rotating the manual input portion in the first direction until a second torque is measured, determining a second rotational angle at which the second torque was measured, and verifying a second load path if a backlash is within a predetermined range.

16 Claims, 5 Drawing Sheets

(51) Int. Cl.
*B64C 13/32* (2006.01)
*G01M 13/02* (2019.01)
*F16H 19/02* (2006.01)
*B64C 13/50* (2006.01)

(52) U.S. Cl.
CPC ..... *F16H 25/2015* (2013.01); *F16H 25/2204* (2013.01); *G01M 13/02* (2013.01); *F16H 2025/2065* (2013.01); *F16H 2025/2081* (2013.01)

(58) Field of Classification Search
CPC .. F16H 25/2021; F16H 25/2454; F16H 19/02; F16H 2025/2065; F16H 2025/2081; F16H 2025/2059; F16H 2025/2075; G01M 13/02; B64C 13/32; B64C 13/34; B64C 13/341
USPC .......................................................... 74/89.26
See application file for complete search history.

(56) References Cited

U.S. PATENT DOCUMENTS

| | | | | | |
|---|---|---|---|---|---|
| 3,766,790 | A | * | 10/1973 | Weir | B64C 13/00 74/89.26 |
| 4,201,271 | A | * | 5/1980 | Evans | B23Q 1/70 173/146 |
| 4,246,991 | A | * | 1/1981 | Oldakowski | F16D 49/02 192/223.4 |
| 4,715,262 | A | * | 12/1987 | Nelson | F16H 25/205 89/36.02 |
| 4,990,122 | A | * | 2/1991 | Grimm | B64C 13/341 464/23 |
| 5,094,118 | A | * | 3/1992 | Morita | B25J 9/102 74/424.9 |
| 5,214,972 | A | * | 6/1993 | Larson | F16H 25/205 74/89.26 |
| 5,582,390 | A | * | 12/1996 | Russ | B64C 13/28 244/99.2 |
| 5,865,272 | A | * | 2/1999 | Wiggins | F16H 25/2018 185/40 R |
| 5,944,148 | A | * | 8/1999 | Bae | B64C 13/34 188/134 |
| 6,109,415 | A | * | 8/2000 | Morgan | B64C 13/28 192/223.1 |
| 7,866,602 | B2 | | 1/2011 | Port-Robach et al. | |
| 8,943,794 | B2 | * | 2/2015 | Moradell-Casellas | F02K 1/72 239/265.31 |
| 2005/0199464 | A1 | * | 9/2005 | Bartley | F16D 65/028 192/45.004 |
| 2006/0081076 | A1 | * | 4/2006 | Otaki | F16D 65/18 74/89.4 |
| 2006/0102697 | A1 | * | 5/2006 | Nagai | F16H 25/2021 228/101 |
| 2006/0213295 | A1 | * | 9/2006 | Blackwelder | F16H 25/20 74/89.23 |
| 2007/0169578 | A1 | * | 7/2007 | Christensen | F16H 25/2021 74/89.37 |
| 2008/0072695 | A1 | * | 3/2008 | Hudson | B64C 25/24 74/89.25 |
| 2008/0084130 | A1 | * | 4/2008 | Darby | F16H 25/205 310/83 |
| 2008/0184828 | A1 | * | 8/2008 | Chen | F16H 25/20 74/25 |
| 2008/0282840 | A1 | * | 11/2008 | Shimada | F16H 25/20 74/841 |
| 2010/0001125 | A1 | * | 1/2010 | Cavalier | B64C 13/341 244/99.3 |
| 2010/0050796 | A1 | * | 3/2010 | Eschborn | B63B 19/24 74/89.37 |
| 2010/0125380 | A1 | * | 5/2010 | Brueckner | F16H 25/2021 701/3 |
| 2010/0162837 | A1 | * | 7/2010 | Cavalier | F16H 25/22 74/89.23 |
| 2010/0213310 | A1 | * | 8/2010 | Flatt | F16H 25/2454 244/99.2 |
| 2010/0313682 | A1 | * | 12/2010 | Morita | F16H 25/2021 73/862.627 |
| 2011/0048147 | A1 | * | 3/2011 | Keech | B64C 13/341 74/89.26 |
| 2011/0079099 | A1 | * | 4/2011 | Himmelmann | F16H 25/2015 74/411.5 |
| 2012/0067975 | A1 | * | 3/2012 | Vauchel | F02K 1/72 239/265.33 |
| 2013/0001357 | A1 | | 1/2013 | Cyrot | |
| 2013/0249464 | A1 | * | 9/2013 | Knox | B60G 17/0157 318/625 |
| 2014/0190291 | A1 | | 7/2014 | Medina | |
| 2015/0027251 | A1 | * | 1/2015 | Himmelmann | F16H 25/2021 74/89.27 |
| 2015/0060602 | A1 | * | 3/2015 | Naubert | F16H 25/2204 244/99.3 |
| 2015/0267793 | A1 | * | 9/2015 | Bernard | B64C 13/341 74/411.5 |
| 2016/0091039 | A1 | * | 3/2016 | Masuda | F16D 55/225 188/72.1 |
| 2016/0131212 | A1 | * | 5/2016 | Yamasaki | F16D 65/183 188/69 |
| 2016/0304188 | A1 | * | 10/2016 | Moulon | B64C 13/341 |
| 2016/0312867 | A1 | * | 10/2016 | Larson | B64C 13/341 |
| 2016/0369877 | A1 | * | 12/2016 | Gitnes | F16H 25/2454 |
| 2016/0377099 | A1 | * | 12/2016 | Stauder | H02K 7/06 92/136 |
| 2017/0088251 | A1 | * | 3/2017 | Nfonguem | B64C 13/40 |
| 2017/0141647 | A1 | * | 5/2017 | Defosse | H02K 7/10 |
| 2018/0080535 | A1 | * | 3/2018 | Vermande | F16D 65/18 |
| 2018/0087634 | A1 | * | 3/2018 | Muster | F16H 25/205 |

* cited by examiner

ACTUATOR AND METHOD

CROSS-REFERENCE TO RELATED APPLICATION

This application claims the benefit of U.S. Provisional Patent Application Ser. No. 62/549,630, filed on Aug. 24, 2017, the disclosure of which is hereby incorporated herein by reference in its entirety.

TECHNICAL FIELD

The present disclosure generally relates to actuators, including linear actuators that may be used in connection with aircraft.

BACKGROUND

This background description is set forth below for the purpose of providing context only. Therefore, any aspect of this background description, to the extent that it does not otherwise qualify as prior art, is neither expressly nor impliedly admitted as prior art against the instant disclosure.

Some actuators do not provide any indication that components have failed and/or it may be difficult to determine if components have failed.

An example of a linear actuator is described in U.S. Pat. No. 8,281,678, which is owned by the assignee hereof and is hereby incorporated by reference in its entirety as though fully set forth herein.

There is a desire for solutions/options that minimize or eliminate one or more challenges or shortcomings of actuators. The foregoing discussion is intended only to illustrate examples of the present field and should not be taken as a disavowal of scope.

SUMMARY

In embodiments, an actuator may include an end fitting, a ball screw connected to the end fitting, a ball nut engaged with the ball screw, a rod disposed at least partially within the ball screw, the rod including a threaded portion, and/or a rotating member engaged with the rod.

With embodiments, a method of verifying an actuator may include rotating a manual input portion in a first direction under substantially no load until the manual input portion stops, rotating the manual input portion in a second, opposite direction until a first torque is measured, determining a first rotational angle at which the first torque was measured, rotating the manual input portion in the first direction until a second torque is measured, determining a second rotational angle at which the second torque was measured, determining a backlash according to a difference between the first rotational angle and the second rotational angle, and/or verifying a secondary load path if a backlash is within a predetermined range The foregoing and other aspects, features, details, utilities, and/or advantages of embodiments of the present disclosure will be apparent from reading the following description, and from reviewing the accompanying drawings.

DETAILED DESCRIPTION

Reference will now be made in detail to embodiments of the present disclosure, examples of which are described herein and illustrated in the accompanying drawings. While the present disclosure will be described in conjunction with embodiments and/or examples, it will be understood that they are not intended to limit the present disclosure to these embodiments and/or examples. On the contrary, the present disclosure is intended to cover alternatives, modifications, and equivalents.

Figure 1:
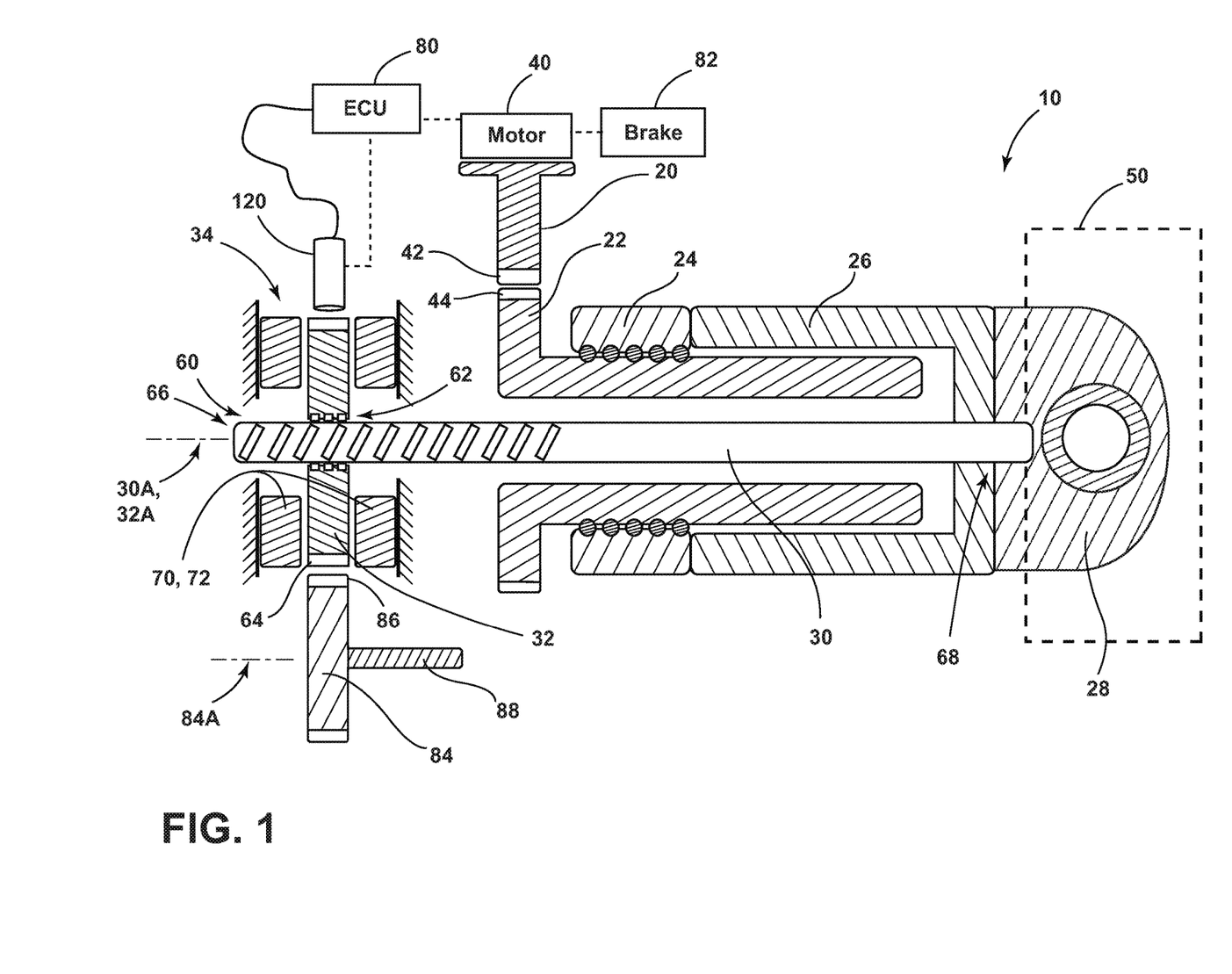
FIG. 1 is a cross-sectional view generally illustrating an embodiment of an actuator according to teachings of the present disclosure.
Figure 2:
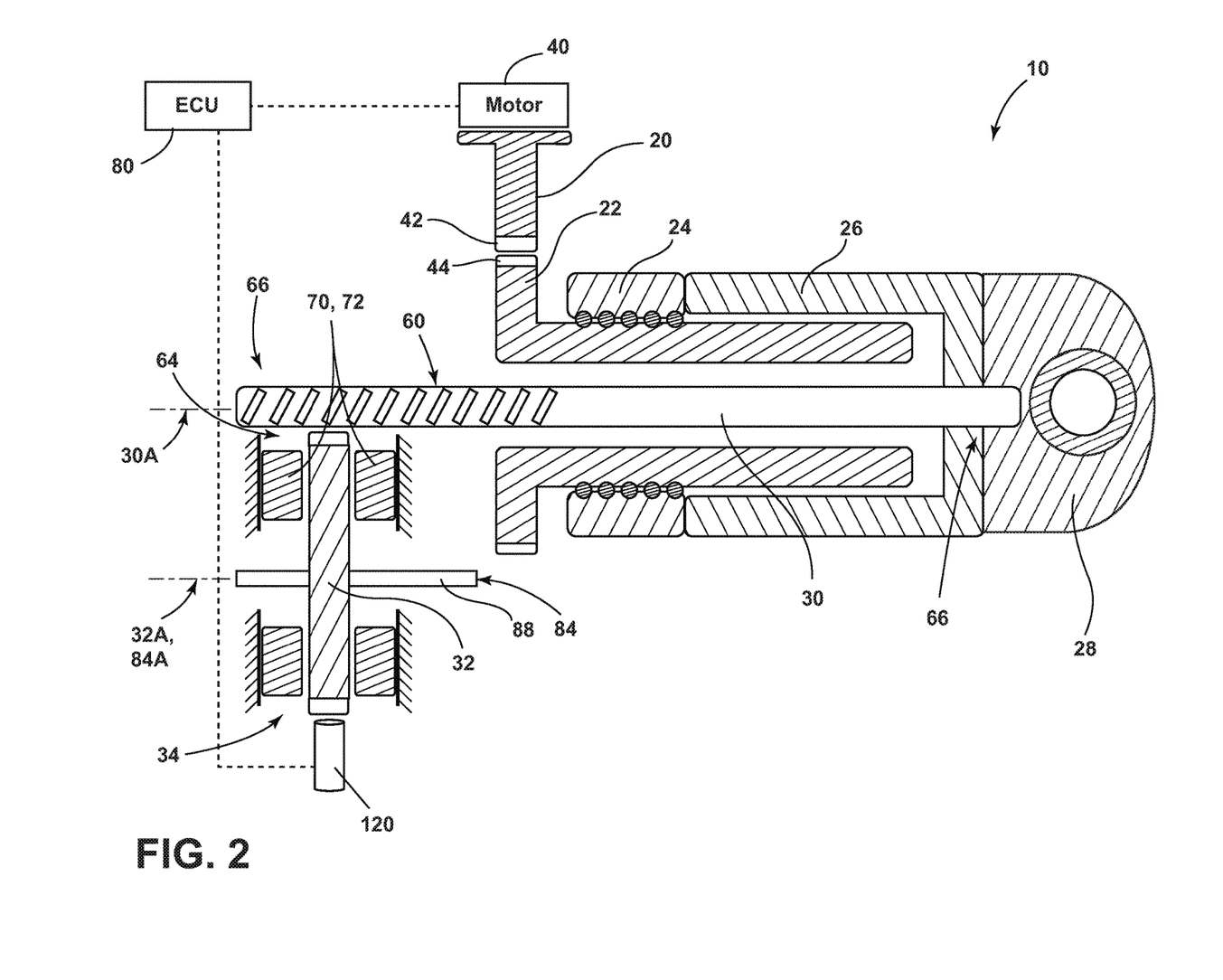
FIG. 2 is a cross-sectional view generally illustrating an embodiment of an actuator according to teachings of the present disclosure.

In embodiments, such as generally illustrated in FIGS. 1 and 2, an actuator 10 may include a drive member 20, a ball screw 22, a ball nut 24, an extension tube 26, an end fitting 28, a rod 30, a rotating member 32, and/or an axial load restrictor 34.

With embodiments, a drive member 20 may be connected to and/or may be at least partially integrated with a motor 40, such an electric motor. The drive member 20 may be engaged with the ball screw 22, such as via a toothed engagement between outer gear profiles 42, 44 of the drive member 20 and the ball screw 22, and rotation of the drive member 20 may cause rotation of the ball screw 22. The ball nut 24 may be engaged with the ball screw 22 such that rotation of the ball screw 22 may cause translation of the ball nut 24 (e.g., in an axial direction). The extension tube 26 and/or the end fitting 28 may be connected to the ball nut 24 such that the extension tube 26 and/or the end fitting 28 may translate with the ball nut 24. The extension tube 26 may connect the ball nut 24 with the end fitting 28. The ball screw 22 may extend at least partially into the extension tube 26 and may or may not be engaged with the extension tube 26. A component to be actuated 50, such as, for example and without limitation, an aircraft flap or panel, may be connected to the end fitting 28 and/or may be actuated via translation of the end fitting 28.

In embodiments, an actuator 10 may include a primary load path and/or a secondary/backup load path. A primary load path may include the end fitting 28, the extension tube 26, the ball nut 24, the ball screw 22, and/or the drive member 20. For example and without limitation, in an initial or normal state, loads applied to the end fitting 28 may be transmitted from the end fitting 28 to the extension tube 26, from the extension tube 26 to the ball nut 24, from the ball nut 24 to the ball screw 22, and/or from the ball screw 22 to the drive member 20. A secondary/backup load path may include the end fitting 28, the rod 30, the rotating member 32, and/or the axial load restrictor 34. For example and without limitation, in a failure state of the primary load path, loads applied to the end fitting 28 may be transmitted from the end fitting 28 to the rod 30, from the rod 30 to the rotating member 32, from the rotating member 32 to the axial load restrictor 34, and/or from the axial load restrictor 34 to one or more other portions of the actuator 10.

Figure 3:
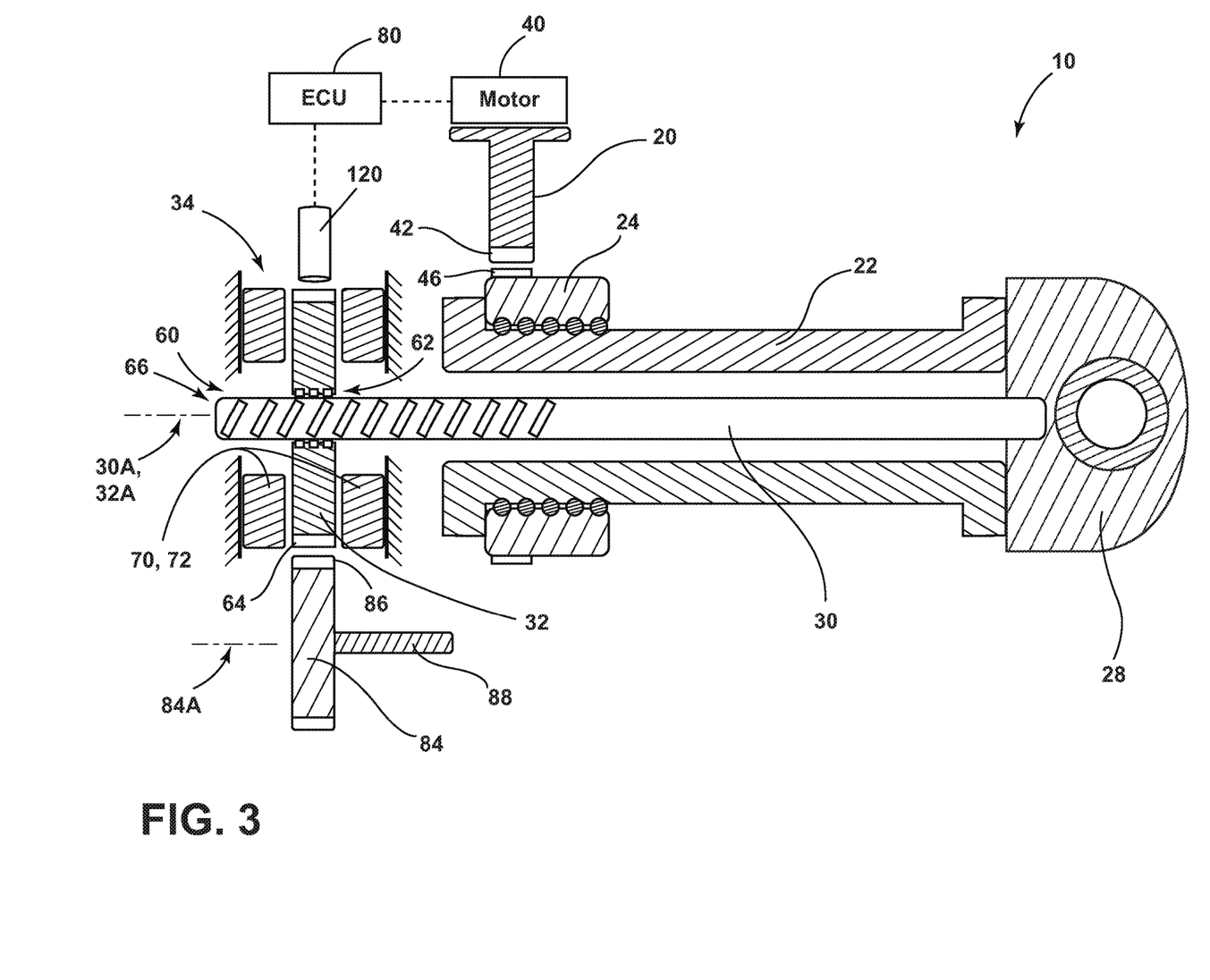
FIG. 3 is a cross-sectional view generally illustrating an embodiment of an actuator according to teachings of the present disclosure.
Figure 4:
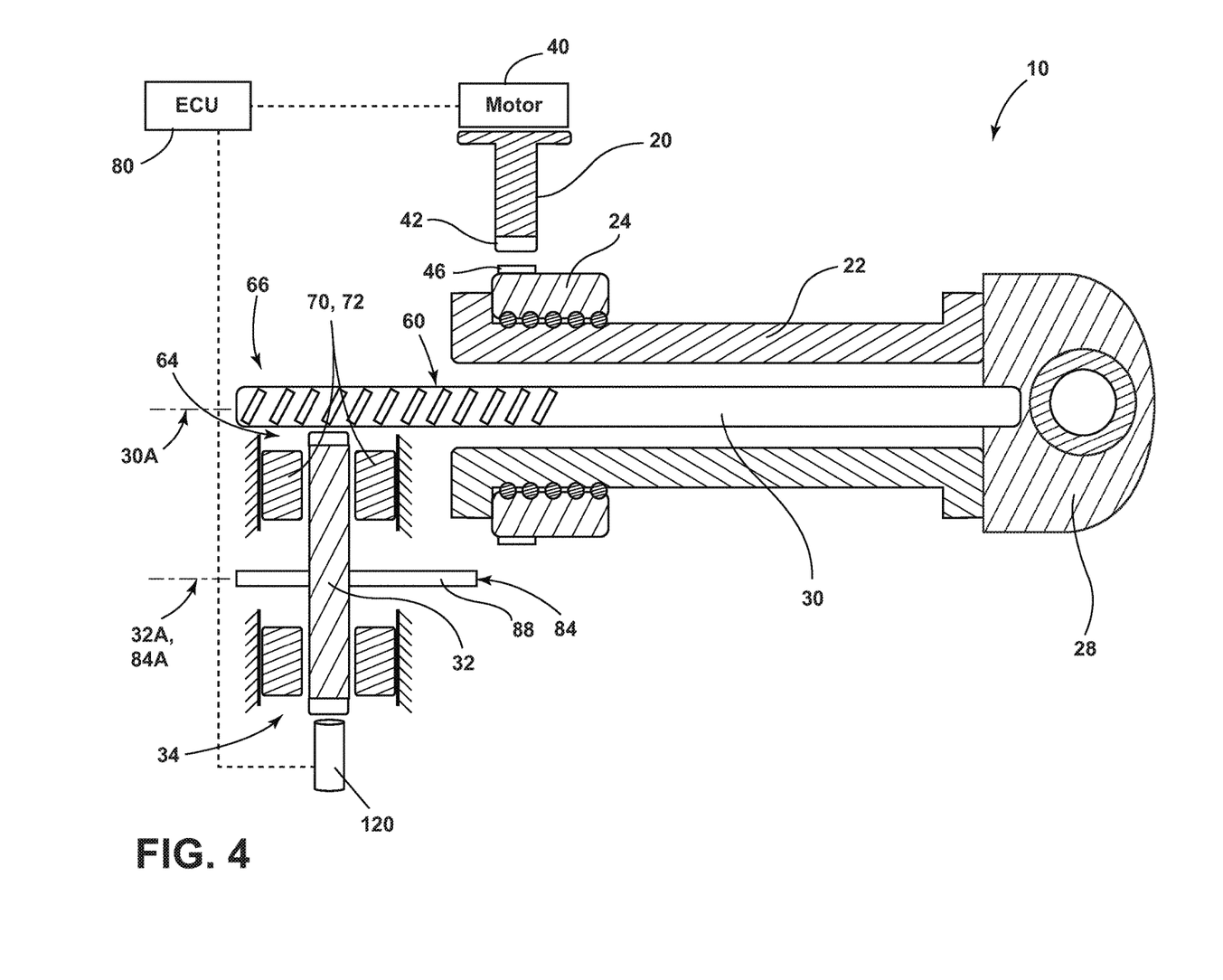
FIG. 4 is a cross-sectional view generally illustrating an embodiment of an actuator according to teachings of the present disclosure.

In embodiments, such as generally illustrated in FIGS. 3 and 4, a drive member 20 of an actuator 10 may be connected to or engage a ball nut 24 of the actuator 10 (e.g., directly) such that rotation of the drive member 20 may cause rotation of the ball nut 24. For example and without limitation, an outer gear profile 42 of the drive member 20 may engage an outer gear profile 46 of the ball nut 24. A ball nut 24 may be engaged with a ball screw 22 such that rotation of the ball nut 24 may cause translation of the ball screw 22. A rod 30 may be connected to translate with the ball screw 22. A primary load path may include an end fitting 28, the ball screw 22, and the ball nut 24. For example and without limitation, in an initial or normal state, loads applied to the end fitting 28 may be transmitted from the end fitting 28 to the ball screw 22, and/or from the ball screw 22 to the ball nut 24. A secondary/backup load path may include the end fitting 28, the rod 30, a rotating member 32, and/or an axial load restrictor 34. For example and without limitation, in a failure state of the primary load path, loads applied to the end fitting 28 may be transmitted from the end fitting 28 to the rod 30, from the rod 30 to the rotating member 32, from the rotating member 32 to the axial load restrictor 34, and/or from the axial load restrictor 34 to one or more other portions of the actuator 10.

With embodiments, such as generally illustrated in FIGS. 1-4, a rod 30 may be connected to the end fitting 28 and may translate with the end fitting 28. The rod 30 may be disposed at least partially (e.g., radially) within the ball screw 22. The rod 30 may include an engagement portion 60 that may be engaged with the rotating member 32 such that translation of the rod 30 may cause rotation of the rotating member 32. For example and without limitation, the engagement portion 60 may include threads that may be configured for engagement with an inner profile 62, such as threads or balls, of the rotating member 32 (e.g., if the rotating member 32 is configured as an Acme nut or ball nut). Additionally or alternatively, an engagement portion 60 may include a worm profile that may be configured for engagement with an outer profile or threads 64 of the rotating member 32 (e.g., if the rotating member 32 is configured a worm wheel). The engagement portion 60 may be disposed at or about a proximate end 66 of the rod 30. A distal end 68 of the rod 30 may be connected to the end fitting 28.

In embodiments, a rotating member 32 may include one or more of a variety of shapes, sizes, configurations, and/or materials. For example and without limitation, and as generally illustrated in FIGS. 1 and 3, the rotating member 32 may include or be configured as an Acme nut or ball nut that may be disposed at least partially around the rod 30, may rotate about the rod 30, and/or may be configured to engage threads of the engagement portion 60 of the rod 30. An axis 32A of the rotating member 32 may be substantially aligned with an axis 30A of the rod 30, and/or the rotating member 32 and the rod 30 may include a common axis.

With embodiments, such as generally illustrated in FIGS. 2 and 4, a rotating member 32 may include or be configured as a worm wheel with an outer profile 64 that may be configured to engage a worm profile of the engagement portion 60 of the rod 30. A rotating member 32 with a worm wheel configuration may rotate about an axis 32A that may offset (e.g., radially) from an axis 30A of the rod 30.

In embodiments, an interface between the rod 30 and the rotating member 32 may be configured such that, in an initial or normal state, a minimum of a backlash between the rod 30 and the rotating member 32 may be greater than a maximum of a backlash between the ball screw 22 and the ball nut 24. For example and without limitation, under initial or normal conditions, axial loads may be transmitted from the end fitting 28 through the extension tube 26 to the ball nut 24 and then to the ball screw 22 (e.g., via a primary load path), while the rod 30 and/or a secondary load path may be substantially unloaded. In the event of a primary load path failure, the backlash of the primary load path may increase and may meet or exceed the minimum backlash of the interface between the rod 30 and the rotating member 32, and loads may be transmitted in whole or in part via a secondary load path.

With embodiments, an actuator 10 may include an axial load restrictor 34. An axial load restrictor 34 may include one or more of a variety of shapes, sizes, configurations, and/or materials. For example and without limitation, an axial load restrictor 34 may include a plurality of skewed bearings or rollers 70 that may be disposed at opposite axial sides of the rotating member 32. Additionally or alternatively, an axial load restrictor 34 may include one or more detent components 72 that may be configured to restrict and/or lock rotation. An axial load restrictor 34 may restrict rotation of the rotating member 32 and/or translation of the rod 30, such as if an axial load above an axial load threshold is applied to the end fitting 28 and/or the rod 30. For example and without limitation, an axial load restrictor 34 may generate a drag torque that may resist rotation of the rotating member 32. An axial load restrictor 34 may be configured to generate a drag torque large enough to exceed a stall torque of a motor 40 and/or to cause a motor 40 to exceed an electrical current limit. An electronic control unit (ECU) 80 may sense or detect that a stall torque and/or electric current limit has been exceeded and determine that an error or malfunction have occurred. The ECU 80 may cause the motor 40 to shut down and/or the ECU 80 may transmit an error code or message (e.g., that a primary load path failure has occurred), such as to a pilot of an aircraft. A motor brake 82 may be engaged (e.g., via the ECU 80), which may restrict and/or lock rotation of a primary load path and a secondary load path may partially or fully support an output load.

With embodiments, a rotating member 32 may include and/or may be connected to a manual/test input portion 84. For example and without limitation, a manual input portion 84 may include a gear that may include teeth 86 configured for engagement with an outer profile or threads 64 of the rotating member (see, e.g., FIGS. 1 and 3). With embodiments, a manual input portion 84 may include a shaft 88 that may extend (e.g., axially) from the rotating member 32, such as from a center of the rotating member 32 (see, e.g., FIGS. 2 and 4). Rotation of the manual input portion 84 may cause rotation of the rotating member 32, such as relative to the rod 30. Rotation of the manual input portion 84 may be conducted manually and/or automatically, such as via an electric motor.

Figure 5:
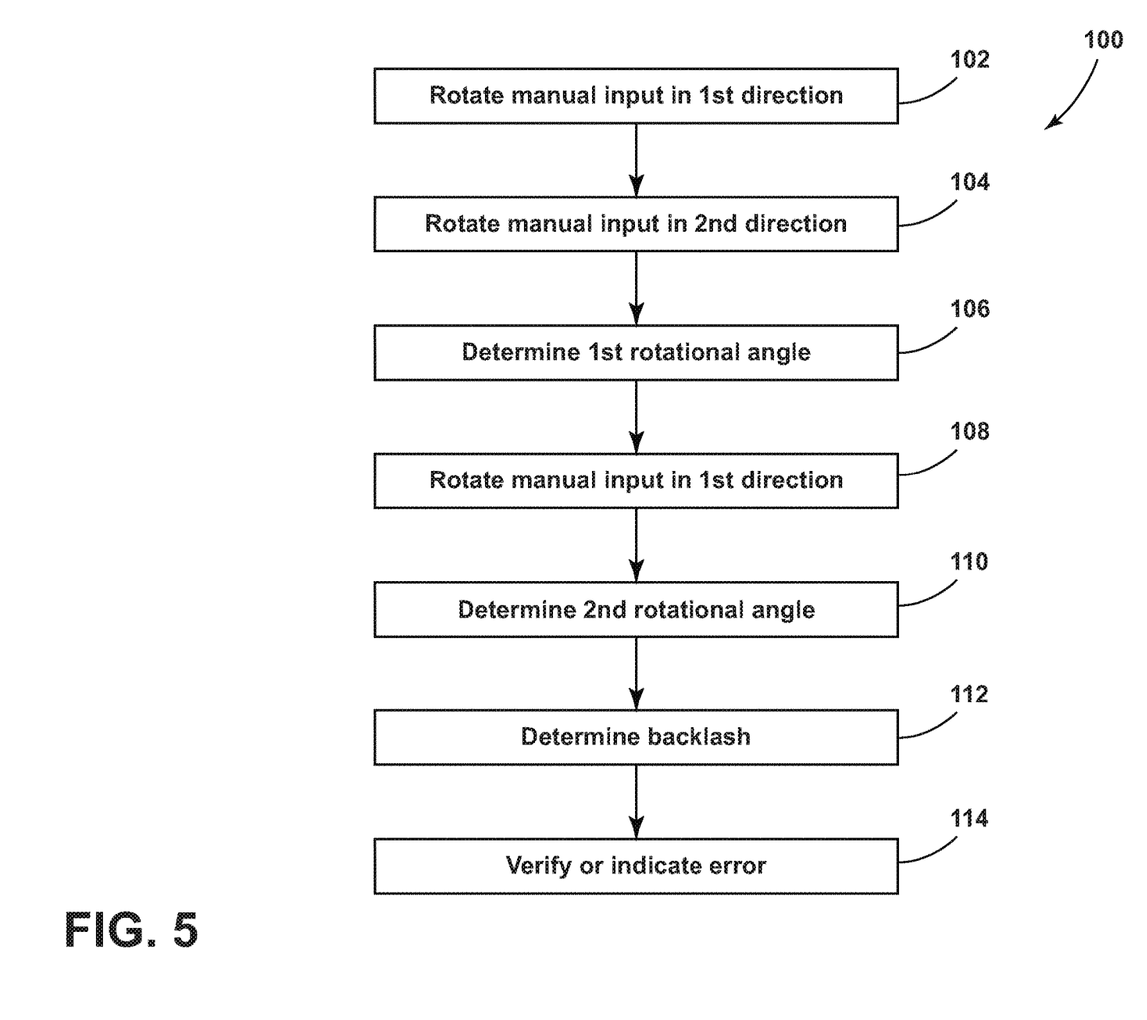
FIG. 5 is a flow diagram generally conveying an embodiment of a method of verifying an actuator according to teachings of the present disclosure.

With embodiments, such as generally illustrated in FIG. 5, a method 100 of verifying or testing an actuator 10 may include rotating a manual input portion 84 in a first direction (e.g., counterclockwise) under minimal or no load until the manual input portion 84 and/or the rotating member 32 stop rotating (step 102). A load may be reduced or eliminated, for example only, by applying a motor brake. The manual input portion 84 may be rotated in a second, opposite direction (e.g., clockwise) until a first torque within a torque range is measured (step 104). A first rotational angle, at which the first torque was measured, may be determined and/or recorded (step 106). The manual input portion 84 may be rotated in the first direction (e.g., again) until a second torque within the torque range is measured (step 108). The first torque and the second torque may or may not be substantially equal. A second rotational angle, at which the second torque was measured, may be determined and/or recorded (step 110). A backlash of the rotating member 32 relative to the rod 30 may be determined and/or may correspond to a difference between the first rotational angle and the second rotational angle (step 112). Proper functioning/structural integrity of a secondary load path may be verified (step 114). If the determined backlash is within a backlash range, the secondary load path may be functioning properly. If the determined backlash is not within the backlash range, the secondary load path may not be functioning properly, and an ECU 80 may be configured to provide an indication or warning of the malfunction. The method 100 of verifying an actuator 10 may be conducted or controlled in whole or in part via an ECU 80.

With embodiments, such as generally illustrated in FIGS. 2 and 4, an actuator 10 may include one or more position sensors 120. In embodiments, for example and without limitation, a position sensor 120 may comprise a Hall effect or similar sensor. A position sensor 120 may be configured to measure and/or sense a position of a rotating member 32. For example and without limitation, a position sensor 120 may be configured to provide a signal and/or data corresponding to a first rotational angle and/or a second rotational angle that may be used to determine backlash (e.g., in steps 106, 110 of method 100). An ECU 80 may be connected to the position sensor(s) 120 and/or may determine a backlash of the rod 30 and the rotating member 32 according to a difference between the first rotational angle and the second rotational angle.

In embodiments, an ECU 80 may include an electronic controller and/or include an electronic processor, such as a programmable microprocessor and/or microcontroller. In embodiments, an ECU 80 may include, for example, an application specific integrated circuit (ASIC). An ECU 80 may include a central processing unit (CPU), a memory (e.g., a non-transitory computer-readable storage medium), and/or an input/output (I/O) interface. An ECU 80 may be configured to perform various functions, including those described in greater detail herein, with appropriate programming instructions and/or code embodied in software, hardware, and/or other medium. In embodiments, an ECU 80 may include a plurality of controllers. In embodiments, an ECU 80 may be connected to a display, such as a touch-screen display.

Various embodiments are described herein for various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments.

Reference throughout the specification to "various embodiments," "with embodiments," "in embodiments," or "an embodiment," or the like, means that a particular feature, structure, or characteristic described in connection with the embodiment is included in at least one embodiment. Thus, appearances of the phrases "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or non-functional. Moreover, many modifications may be made to adapt a particular situation or material to the teachings of the present disclosure without departing from the scope thereof.

It should be understood that references to a single element are not necessarily so limited and may include one or more of such element. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of embodiments.

Joinder references (e.g., attached, coupled, connected, and the like) are to be construed broadly and may include intermediate members between a connection of elements and relative movement between elements. As such, joinder references do not necessarily imply that two elements are directly connected/coupled and in fixed relation to each other. The use of "e.g." in the specification is to be construed broadly and is used to provide non-limiting examples of embodiments of the disclosure, and the disclosure is not limited to such examples. Uses of "and" and "or" are to be construed broadly (e.g., to be treated as "and/or"). For example and without limitation, uses of "and" do not necessarily require all elements or features listed, and uses of "or" are intended to be inclusive unless such a construction would be illogical.

While processes, systems, and methods may be described herein in connection with one or more steps in a particular sequence, it should be understood that such methods may be practiced with the steps in a different order, with certain steps performed simultaneously, with additional steps, and/or with certain described steps omitted.

It is intended that all matter contained in the above description or shown in the accompanying drawings shall be interpreted as illustrative only and not limiting. Changes in detail or structure may be made without departing from the present disclosure.

What is claimed is:

1. An actuator, comprising:
an end fitting configured to be connected to a component to be actuated;
a ball screw;
a ball nut engaged with the ball screw;
a rod disposed at least partially within the ball screw and connected to the end fitting;
a rotating member engaged with the rod; and
an axial load restrictor that restricts rotation of the rotating member;
wherein, in an initial state in which a minimum of a backlash of the rod and the rotating member is greater than a maximum of a backlash of the ball screw and the ball nut, an axial load applied to the end fitting is transmitted, via a primary load path, from the end fitting to the ball nut and from the ball nut to the ball screw; and, in a failure state, in which the backlash of the ball screw and the ball nut is greater than the minimum of the backlash of the rod and the rotating member, the axial load applied to the end fitting is transmitted, via a secondary load path, from the end fitting to the rod, from the rod to the rotating member, and from the rotating member to the axial load restrictor;

wherein the rod includes a worm profile and the rotating member includes a worm wheel.

2. The actuator of claim 1, wherein the axial load restrictor is configured to provide a drag torque resisting rotation of the rotating member.

3. The actuator of claim 1, including a motor configured to drive one of the ball screw and the ball nut; wherein the axial load restrictor is configured to generate a drag torque larger than a stall torque of the motor.

4. The actuator of claim 1, wherein the axial load restrictor includes a plurality of skewed bearings.

5. The actuator of claim 4, wherein the plurality of skewed bearings are disposed at opposite axial sides of the rotating member.

6. The actuator of claim 1, wherein the rotating member is configured to rotate about an axis offset from an axis of the rod.

7. The actuator of claim 1, wherein the rotating member and the ball screw are configured to rotate about a common axis.

8. The actuator of claim 1, wherein the rotating member includes a manual input portion.

9. The actuator of claim 8, wherein the manual input portion is configured to cause rotation of the rotating member to verify integrity of a secondary load path.

10. The actuator of claim 1, wherein the ball screw is connected to the end fitting.

11. The actuator of claim 1, wherein the end fitting is connected to an aircraft flap or panel.

12. The actuator of claim 1, further comprising a motor and a drive member at least partially integrated with the motor and engaging with the ball screw via a toothed engagement between respective outer gear profiles of the drive member and the ball screw.

13. The actuator of claim 1, wherein the axial load restrictor includes at least one of:
 a plurality of skewed bearings or rollers disposed at opposite axial sides of the rotating member; and
 one or more detents configured to restrict the rotation of the rotating member.

14. The actuator of claim 1, wherein the rod has an engagement portion that is engaged with the rotating member and that is disposed at or around a proximate end of the rod, and a distal end of the rod is connected to the end fitting.

15. A method of testing an actuator, the method including:
 providing an actuator, the actuator including:
  an end fitting configured to be connected to a component to be actuated;
  a ball screw connected to the end fitting;
  a ball nut engaged with the ball screw;
  a rod disposed at least partially within the ball screw and connected to the end fitting;
  a rotating member engaged with the rod, the rotating member include a manual input portion; and
  an axial load restrictor that restricts rotation of the rotating member;
 rotating the manual input portion in a first direction under substantially no load until the manual input portion stops;
 rotating the manual input portion in a second, opposite direction until a first torque is measured;
 determining a first rotational angle at which the first torque was measured;
 rotating the manual input portion in the first direction until a second torque is measured;
 determining a second rotational angle at which the second torque was measured;
 determining a backlash of the rod and the rotating member according to a difference between the first rotation angle and the second rotation angle; and
 applying an axial load to the end fitting, and transmitting the axial load, via a primary load path, from the end fitting to the ball nut and from the ball nut to the ball screw if the backlash of the rod and rotating member is greater than a maximum of a backlash of the ball screw and the ball nut; or via a secondary load path, from the end fitting to the rod, from the rod to the rotating member, and from the rotating member to the axial load restrictor if the backlash of the ball screw and the ball nut is greater than the minimum of the backlash of the rod and the rotating member;
 wherein the rod includes a worm profile and the rotating member includes a worm wheel.

16. The method of claim 15, wherein at least one of the first rotational angle and the second rotational angle are determined via a position sensor.

* * * * *